(12) United States Patent
Ukai et al.

(10) Patent No.: US 12,203,178 B2
(45) Date of Patent: *Jan. 21, 2025

(54) ELECTROCHEMICAL HYDROGEN PUMP

(71) Applicant: Panasonic Intellectual Property Management Co., Ltd., Osaka (JP)

(72) Inventors: Kunihiro Ukai, Nara (JP); Norihiko Kawabata, Osaka (JP); Osamu Sakai, Osaka (JP); Hidenobu Wakita, Kyoto (JP); Jin Zhang, Osaka (JP); Yukimune Kani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,841

(22) Filed: Mar. 7, 2024

(65) Prior Publication Data

US 2024/0218525 A1 Jul. 4, 2024

Related U.S. Application Data

(63) Continuation of application No. 16/418,327, filed on May 21, 2019, now Pat. No. 11,952,671.

(30) Foreign Application Priority Data

Jun. 14, 2018 (JP) .................................. 2018-113854

(51) Int. Cl.
*C25B 1/02* (2006.01)
*B01D 53/32* (2006.01)

(52) U.S. Cl.
CPC .............. *C25B 1/02* (2013.01); *B01D 53/326* (2013.01)

(58) Field of Classification Search
CPC .......... B01D 53/326; C25B 1/04; C25B 1/042; C25B 1/02; C25B 9/77
See application file for complete search history.

(56) References Cited

U.S. PATENT DOCUMENTS

| 11,952,671 B2 * | 4/2024 | Ukai ..................... F04B 45/047 |
| 2004/0211679 A1 | 10/2004 | Wong et al. |

(Continued)

FOREIGN PATENT DOCUMENTS

| EP | 3306722 A1 | 4/2018 |
| JP | 2006-070322 A | 3/2006 |

(Continued)

OTHER PUBLICATIONS

The Extended European Search Report dated Nov. 22, 2019 for the related European Patent Application No. 19174793.0.

(Continued)

*Primary Examiner* — Ciel P Contreras
(74) *Attorney, Agent, or Firm* — Rimon P.C.

(57) ABSTRACT

An electrochemical hydrogen pump includes at least one hydrogen pump unit including an electrolyte membrane, an anode on one main surface of the electrolyte membrane, a cathode on the other main surface of the electrolyte membrane, an anode separator on the anode, and a cathode separator on the cathode, the at least one hydrogen pump unit transferring, to the cathode, hydrogen supplied to the anode and pressurizing the hydrogen, a first fixing member for preventing movement of the cathode separator in a direction in which the cathode separator is stacked, a first end plate on the anode separator at one end in the stacking direction, a second end plate on the cathode separator at the other end in the stacking direction, and a first gas flow (Continued)

channel through which hydrogen in the cathode is supplied to a first space between the second end plate and the cathode separator.

5 Claims, 6 Drawing Sheets

(56) References Cited

U.S. PATENT DOCUMENTS

| | | |
|---|---|---|
| 2006/0201800 A1 | 9/2006 | Nakazawa et al. |
| 2006/0254907 A1 | 11/2006 | Taruya et al. |
| 2012/0217156 A1 | 8/2012 | Nakazawa et al. |
| 2015/0122637 A1 | 5/2015 | Haryu et al. |
| 2018/0094356 A1 | 4/2018 | Ukai |

FOREIGN PATENT DOCUMENTS

| | | |
|---|---|---|
| JP | 2006-233297 A | 9/2006 |
| JP | 2006-307248 A | 11/2006 |
| JP | 2006-316288 A | 11/2006 |
| JP | 2012-177169 A | 9/2012 |

OTHER PUBLICATIONS

Non-Final Office Action dated Jun. 16, 2022 issued in U.S. Appl. No. 16/418,327.
Final Office Action dated Nov. 25, 2022 issued in U.S. Appl. No. 16/418,327.
Non-Final Office Action dated Oct. 18, 2023 issued in U.S. Appl. No. 16/418,327.
Notice of Allowance dated Jan. 18, 2024 issued in U.S. Appl. No. 16/418,327.

* cited by examiner

ELECTROCHEMICAL HYDROGEN PUMP

CROSS-REFERENCE OF RELATED APPLICATIONS

This application is a Continuation of U.S. patent application Ser. No. 16/418,327, filed on May 21, 2019, which in turn claims the benefit of Japanese Patent Application No. 2018-113854, filed on Jun. 14, 2018, the entire disclosures of which Applications are incorporated by reference herein.

BACKGROUND

1. Technical Field

The present disclosure relates to an electrochemical hydrogen pump.

2. Description of the Related Art

Considering environmental problems, such as global warming, and energy problems, such as depletion of oil resources, hydrogen has been focused on as a clean alternative energy source in place of fossil fuels. Essentially, burning hydrogen produces only water, carbon dioxide, which contributes to global warming, is not produced, and few quantities of other compounds, such as nitrogen oxides, are produced. Thus, hydrogen is anticipated as a clean energy source. Fuel cells, an example of devices that use hydrogen highly efficiently as a fuel, have been developed and widely used for automotive power sources and home power generation.

In an upcoming hydrogen society, development of technology for storing hydrogen at high density and transporting and using hydrogen in a reduced volume at low cost is required in addition to development of technology for producing hydrogen. In particular, to encourage the spread of such fuel cells as distributed energy sources, a hydrogen supply infrastructure needs to be established. Furthermore, various suggestions, such as methods for producing and purifying hydrogen and storing purified hydrogen at high density, have been made to provide a stable hydrogen supply.

For example, Japanese Unexamined Patent Application Publication No. 2006-70322 suggests a high-pressure hydrogen producing apparatus. The high-pressure hydrogen producing apparatus includes a stack of a solid polymer electrolyte membrane, power feeders, and separators, with the stack sandwiched between end plates and fastened by fastening bolts passing through the endplates. In the high-pressure hydrogen producing apparatus, when a difference between the pressure applied to the cathode power feeder on the high-pressure side and the pressure applied to the anode power feeder on the low-pressure side increases to a predetermined value or higher, the solid polymer electrolyte membrane and the anode power feeder on the low-pressure side deform. As a result, the contact resistance between the cathode power feeder on the high-pressure side and the solid polymer electrolyte membrane increases.

Thus, the high-pressure hydrogen producing apparatus of Japanese Unexamined Patent Application Publication No. 2006-70322 includes a pressing unit, such as a disc spring or a coil spring, that presses the cathode power feeder on the high-pressure side to make the cathode power feeder adhere to the solid polymer electrolyte membrane if the solid polymer electrolyte membrane and the anode power feeder on the low-pressure side deform. Accordingly, an increase in the contact resistance between the cathode power feeder on the high-pressure side and the solid polymer electrolyte membrane is suppressed.

SUMMARY

In the prior example, however, an increase in the contact resistance between the cathode separator and the cathode in a case where the gas pressure in the cathode increases is not fully investigated. One aspect of the present disclosure is developed in consideration of the foregoing, and one non-limiting and exemplary embodiment provides an electrochemical hydrogen pump that can easily and appropriately suppress an increase in the contact resistance between the cathode separator and the cathode of a hydrogen pump unit, compared with that in the prior art.

To solve the foregoing, in one general aspect, the techniques disclosed here feature an electrochemical hydrogen pump that includes at least one hydrogen pump unit including an electrolyte membrane, an anode in contact with one main surface of the electrolyte membrane, a cathode in contact with the other main surface of the electrolyte membrane, an anode separator stacked on the anode, and a cathode separator stacked on the cathode, the at least one hydrogen pump unit transferring, to the cathode, hydrogen contained in a hydrogen-containing gas supplied to the anode and pressurizing the hydrogen, a first fixing member for preventing movement of the cathode separator in a direction in which the cathode separator is stacked, a first end plate disposed on the anode separator positioned at one end in the stacking direction, a second end plate disposed on the cathode separator positioned at the other end in the stacking direction, and a first gas flow channel through which hydrogen in the cathode is supplied to a first space formed between the second end plate and the cathode separator.

An electrochemical hydrogen pump according to one aspect of the present disclosure exhibits the advantage of easily and appropriately suppressing an increase in the contact resistance between the cathode separator and the cathode of the hydrogen pump unit, compared with that in the prior art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In the high-pressure hydrogen producing apparatus of Japanese Unexamined Patent Application Publication No. 2006-70322, the stack is fastened by fastening bolts passing through end plates and compressed in a stacking direction. However, the inventors conducted thorough investigation and found that high gas pressure in the cathode deforms the cathode separator so as to curve toward the neighboring end plate and accordingly that the end plate also deforms so as to curve outward away from the stack. In a plurality of such stacks, the cathode separator positioned at the end of the plurality of stacks in a stacking direction deforms so as to curve toward the neighboring end plate. Accordingly, the end plate deforms in the same manner as described above.

The above deformation of the cathode separator forms a gap between the cathode separator and the cathode power feeder that is larger than the gap described in paragraph of Japanese Unexamined Patent Application Publication No. 2006-70322. To fill the gap, the distance of the disc spring electrically connecting the cathode power feeder and the cathode separator to each other increases, and thus the electrical resistance of the disc spring increases.

The foregoing can be seen not only in the high-pressure hydrogen producing apparatus of Japanese Unexamined Patent Application Publication No. 2006-70322, but also in an electrochemical hydrogen pump in a prior patent of the applicant.

Figure 1A:
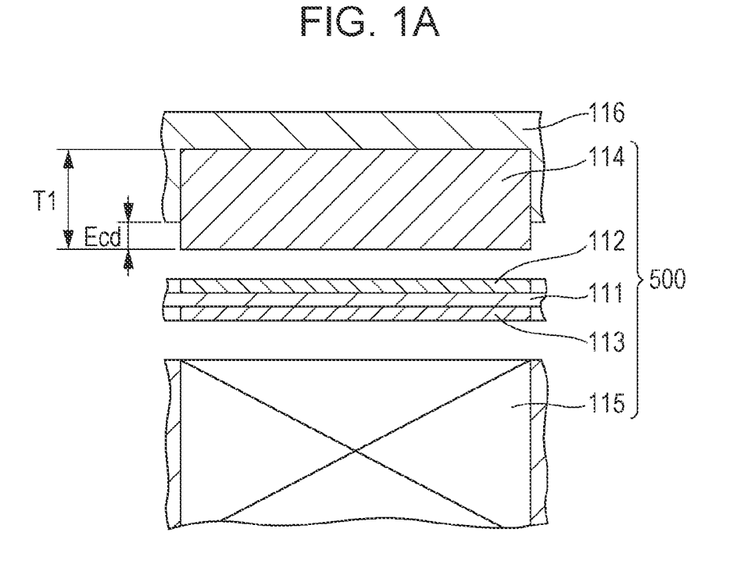
FIG. 1A is an image of an exemplary electrochemical hydrogen pump.

For example, as shown in FIG. 1A, a structure is suggested in which a cathode gas diffusion layer 114 is accommodated in the concave portion of a cathode separator 116 and in which a portion of the cathode gas diffusion layer 114 protrudes by a predetermined amount Ecd from the concave portion in a thickness direction before a stack 500 of an electrolyte membrane 111, a cathode catalyst layer 112, an anode catalyst layer 113, the cathode gas diffusion layer 114, and an anode gas diffusion layer 115 is fastened.

Figure 1B:
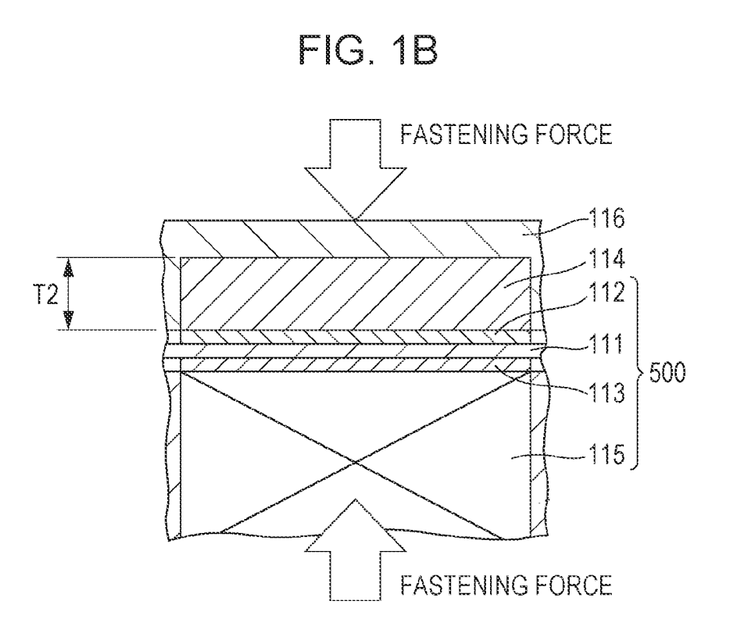
FIG. 1B is an image of an exemplary electrochemical hydrogen pump.

When the stack 500 is fastened, the cathode gas diffusion layer 114 elastically deforms by the amount of protrusion Ecd in a thickness direction, as shown in FIG. 1B.

During the operation of the electrochemical hydrogen pump, when the gas pressure in the cathode gas diffusion layer 114 of the stack 500 increases, high pressure is applied to the anode gas diffusion layer 115, the anode catalyst layer 113, and the electrolyte membrane 111, since the electrolyte membrane 111 prevents gas permeation. Then, the anode gas diffusion layer 115, the anode catalyst layer 113, and the electrolyte membrane 111 are each compressed and deform. However, the cathode gas diffusion layer 114 elastically deforms in a direction in which the thickness T2, which is the thickness after compression by a fastener, returns to thickness T1, which is the thickness before the compression, so that the contact between the cathode catalyst layer 112 and the cathode gas diffusion layer 114 can be appropriately maintained.

When the gas pressure in the cathode increases, however, the cathode separator 116 deforms so as to curve outward toward the neighboring end plate (not shown), as described above, so that a gap is likely to be formed between the bottom surface of the concave portion of the cathode separator 116 and the cathode gas diffusion layer 114. To reliably establish electrical contact between the cathode separator 116 and the cathode gas diffusion layer 114, the amount of protrusion Ecd of the cathode gas diffusion layer 114 needs to be further increased, considering deformation of the cathode separator 116. As a result, when the gas pressure in the cathode increases, the dimension of the cathode gas diffusion layer 114 in a thickness direction increases and electrical resistance of the cathode gas diffusion layer 114 in the thickness direction increases.

Such a problem occurs not only in the above prior patent of the applicant, but also in a structure in which a cathode gas diffusion layer is disposed on a flat surface of a cathode separator having no concave portions.

The inventors found that forming a space between the cathode separator and the second end plate disposed on the cathode separator that communicates with the cathode easily suppresses the above-described increase in the electrical resistance between the cathode gas diffusion layer and the cathode separator and have developed one aspect of the present disclosure as follows.

An electrochemical hydrogen pump according to a first aspect of the present disclosure includes at least one hydrogen pump unit including an electrolyte membrane, an anode in contact with one main surface of the electrolyte membrane, a cathode in contact with the other main surface of the electrolyte membrane, an anode separator stacked on the anode, and a cathode separator stacked on the cathode, the at least one hydrogen pump unit transferring, to the cathode, hydrogen contained in a hydrogen-containing gas supplied to the anode and pressurizing the hydrogen, a first fixing member for preventing movement of the cathode separator in a direction in which the cathode separator is stacked, an anode end plate disposed on the anode separator positioned at one end in the stacking direction, a second end plate disposed on the cathode separator positioned at the other end in the stacking direction, and a first gas flow channel through which hydrogen in the cathode is supplied to a first space formed between the second end plate and the cathode separator.

According to such a structure, the electrochemical hydrogen pump according to the present aspect can easily and appropriately suppress an increase in the contact resistance between the cathode separator and the cathode of the hydrogen pump unit, compared with that in the prior art.

Specifically, high-pressure hydrogen in the cathode of the hydrogen pump unit can be supplied to a first space formed between the second end plate and the cathode separator through a first gas flow channel. Thus, the hydrogen gas pressure in the first space is almost as high as the hydrogen gas pressure in the cathode of the hydrogen pump unit. The load applied by the hydrogen in the first space to the cathode separator suppresses deformation (deflection) of the cathode separator due to the hydrogen gas pressure in the cathode. Therefore, a gap is unlikely to be formed between the cathode separator and the cathode of the hydrogen pump unit, compared with a case in which such a first space is not formed, so that the electrochemical hydrogen pump according to the present aspect can easily and appropriately suppress an increase in the contact resistance between the cathode separator and the cathode of the hydrogen pump unit.

As a result of the inventors' further thorough investigation of the high-pressure hydrogen producing apparatus of Japanese Unexamined Patent Application Publication No. 2006-70322, the inventors found that pressure applied to the anode separator by the anode power feeder deforms the anode separator so as to curve outward toward the neighboring end plate and accordingly that the end plate also deforms so as to curve outward away from the stack. In the high-pressure hydrogen producing apparatus of Japanese Unexamined Patent Application Publication No. 2006-70322, the above deformation of the anode separator forms a gap between the cathode separator and the cathode power feeder that is larger than the gap described in paragraph of Japanese Unexamined Patent Application Publication No. 2006-70322. To fill the gap, the distance of the disc spring electrically connecting the cathode power feeder and the cathode separator to each other increases, and thus, the electrical resistance of the disc spring increases.

In the electrochemical hydrogen pump according to the prior patent by the applicant, when the gas pressure in the cathode increases, the anode gas diffusion layer 115 deforms in the same manner as in Japanese Unexamined Patent Application Publication No. 2006-70322. Then, the anode gas flow channel member (not shown) to which pressure is applied due to the deformation of the anode gas diffusion layer 115 deforms so as to curve outward toward the neighboring end plate (not shown), and accordingly, the end plate deforms so as to curve outward away from the stack 500. To reliably establish the electrical contact between the cathode gas diffusion layer 114 and the electrolyte membrane 111 (cathode catalyst layer 112), the amount of protrusion Ecd of the cathode gas diffusion layer 114 needs to be further increased, considering deformation of members, such as the anode gas flow channel member and the end plate. As a result, when the gas pressure in the cathode increases, the dimension of the cathode gas diffusion layer 114 in a thickness direction increases and the electrical resistance of the cathode gas diffusion layer 114 in the thickness direction increases. Such a problem occurs not only in the above prior patent of the applicant, but also in a structure in which a cathode gas diffusion layer is disposed on a flat surface of a cathode separator having no concave portions.

The inventors found that forming a space between the anode separator and the anode end plate disposed on the anode separator that communicates with the cathode easily suppresses the above-described increase in the electrical resistance between the cathode gas diffusion layer and the electrolyte membrane (cathode catalyst layer) and have developed one aspect of the present disclosure as follows.

An electrochemical hydrogen pump according to a second aspect of the present disclosure may include a second fixing member for preventing movement of the anode separator in a direction in which the anode separator is stacked and a second gas flow channel through which hydrogen generated in the cathode is supplied to a second space formed between the anode end plate and the anode separator in the electrochemical hydrogen pump according to the first aspect.

According to such a structure, the electrochemical hydrogen pump according to the present aspect can supply high-pressure hydrogen generated in the cathode of the hydrogen pump unit to the second space formed between the anode end plate and the anode separator through the second gas flow channel. Thus, the hydrogen gas pressure in the second space is almost as high as the hydrogen gas pressure in the cathode of the hydrogen pump unit. The load applied by the hydrogen in the second space to the anode separator suppresses deformation of the anode separator due to the hydrogen gas pressure in the cathode. Therefore, a gap is unlikely to be formed between the cathode and the electrolyte membrane of the hydrogen pump unit, compared with a case in which such a second space is not formed, so that the electrochemical hydrogen pump according to the present aspect can easily and appropriately suppress an increase in the contact resistance between the cathode and the electrolyte membrane of the hydrogen pump unit.

According to an electrochemical hydrogen pump according to a third aspect of the present disclosure, the first space and the second space may be formed to face each other in the electrochemical hydrogen pump according to the second aspect.

According to such a structure, the load applied by the hydrogen in the first space to the cathode separator and the load applied by the hydrogen in the second space to the anode separator uniformly suppresses deformation, which is due to hydrogen gas pressure in the cathode, in the surface of each member of the hydrogen pump unit from both ends of the hydrogen pump unit. Thus, the electrochemical hydrogen pump according to the present aspect can effectively suppress deformation of each member of the hydrogen pump unit, compared with a case in which the first space and the second space are not formed to face each other.

The expression "the first space and the second space are formed to face each other" means that the first space and the second space are formed such that at least a portion of the first space and at least a portion of the second space overlap each other when viewed in the stacking direction.

According to an electrochemical hydrogen pump in a fourth aspect of the present disclosure, the second gas flow channel may include a communicating channel that connects the first space and the second space to each other in the electrochemical hydrogen pump of the second aspect or the third aspect.

According to such a structure, the electrochemical hydrogen pump in the present aspect can supply high-pressure hydrogen in the cathode of the hydrogen pump unit to the second space through the communicating channel that connects the first space and the second space to each other.

According to an electrochemical hydrogen pump in a fifth aspect of the present disclosure, the first space may be formed parallel to the main surface of the cathode of the electrochemical hydrogen pump in any one of the first aspect to the fourth aspect.

According to such a structure, the load to be applied to the cathode separator can be uniformly applied to the surface thereof on the basis of the hydrogen gas pressure in the first space. Thus, in the electrochemical hydrogen pump in the present aspect, the load applied by the hydrogen in the first space to the cathode separator effectively suppresses deformation of the cathode separator, compared with a case in which the first space is not formed parallel to the main surface of the cathode.

According to an electrochemical hydrogen pump in a sixth aspect of the present disclosure, the area of an opening of the first space that is parallel to the main surface of the cathode separator may be equal to or larger than the area of the main surface of the cathode of the electrochemical hydrogen pump in any one of the first aspect to the fifth aspect.

If the area of an opening of the first space that is parallel to the main surface of the cathode separator is smaller than the area of the main surface of the cathode, deformation due to the hydrogen gas pressure in the cathode may occur in a portion of the cathode separator that faces a portion of the cathode that is not overlapped by the first space.

In the electrochemical hydrogen pump in the present aspect, the area of the opening of the first space is set to be equal to or larger than the area of the main surface of the cathode, so that the first space can overlap all of the main surface of the cathode. Therefore, the load is applied on the basis of the hydrogen gas pressure in the first space to all of a portion of the cathode separator that faces the cathode, and thus, the above risk can be decreased.

According to an electrochemical hydrogen pump in a seventh aspect of the present disclosure, the area of an opening of the first space that is parallel to the main surface of the cathode separator may be equal to or smaller than the area of the main surface of the cathode separator in the electrochemical hydrogen pump in any one of the first aspect to the sixth aspect.

According to an electrochemical hydrogen pump in an eighth aspect of the present disclosure, the second space may be formed parallel to the main surface of the anode in the electrochemical hydrogen pump in any one of the second aspect to the fourth aspect.

According to such a structure, the load to be applied to the anode separator can be uniformly applied to the surface thereof on the basis of the hydrogen gas pressure in the second space. Thus, in the electrochemical hydrogen pump in the present aspect, the load applied by the hydrogen in the second space to the anode separator effectively suppresses deformation of the anode separator, compared with a case in which the second space is not formed parallel to the main surface of the anode.

According to an electrochemical hydrogen pump in a ninth aspect of the present disclosure, the area of an opening of the second space that is parallel to the main surface of the anode separator may be equal to or larger than the area of the main surface of the anode in the electrochemical hydrogen pump in any one of the second aspect to the fifth aspect.

If the area of an opening of the second space that is parallel to the main surface of the anode separator is smaller than the area of the main surface of the anode, deformation due to the hydrogen gas pressure in the cathode may occur in a portion of the anode separator that faces a portion of the anode that is not overlapped by the second space.

In the electrochemical hydrogen pump in the present aspect, the area of the opening of the second space is set to be equal to or larger than the area of the main surface of the anode, so that the second space can overlap all of the main surface of the anode. Therefore, the load is applied on the basis of the hydrogen gas pressure in the second space to all of a portion of the anode separator that faces the anode, and thus, the above risk can be decreased.

According to an electrochemical hydrogen pump in a tenth aspect of the present disclosure, the area of an opening of the second space that is parallel to the main surface of the anode separator may be equal to or smaller than the area of the main surface of the anode separator in the electrochemical hydrogen pump in any one of the second aspect to the fifth aspect and the ninth aspect.

According to an electrochemical hydrogen pump in an eleventh aspect of the present disclosure, the anode may include an anode gas diffusion layer, the cathode may include a cathode gas diffusion layer, and the elastic modulus of the anode gas diffusion layer may be higher than the elastic modulus of the cathode gas diffusion layer in the electrochemical hydrogen pump in any one of the first aspect to the tenth aspect.

Hereinafter, with reference to the drawings, embodiments of the present disclosure will be described. The embodiments described below each illustrate an example of the above aspects. Thus, shapes, materials, components, and the positions and connection modes of the components, which will be described below, are examples and do not limit the above aspects provided that they are not described in Claims. Among the components described below, components not described in the independent Claim showing the broadest concept of the above aspects are described as optional components. In the drawings, description of one of components with the same symbol may be omitted. In the drawings, the components are schematically drawn to facilitate the understanding, so that shapes and dimensional ratios in the drawings may be different from those of actual components.

First Embodiment

Device Structure

Figure 2A:
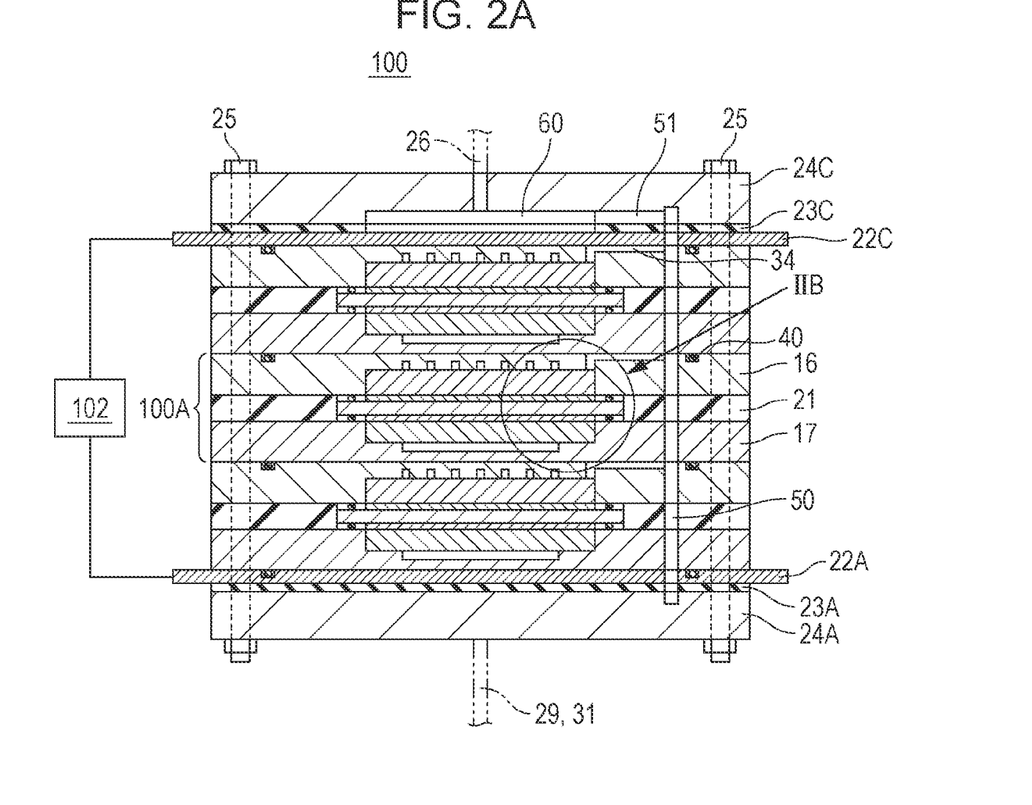
FIG. 2A is an image of an exemplary electrochemical hydrogen pump according to a first embodiment.
Figure 2B:
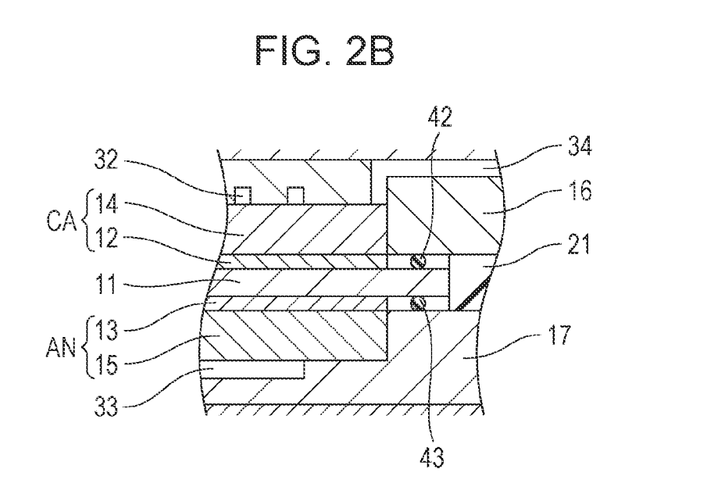
FIG. 2B is an enlarged view of portion IIB of FIG. 2A.
Figure 3A:
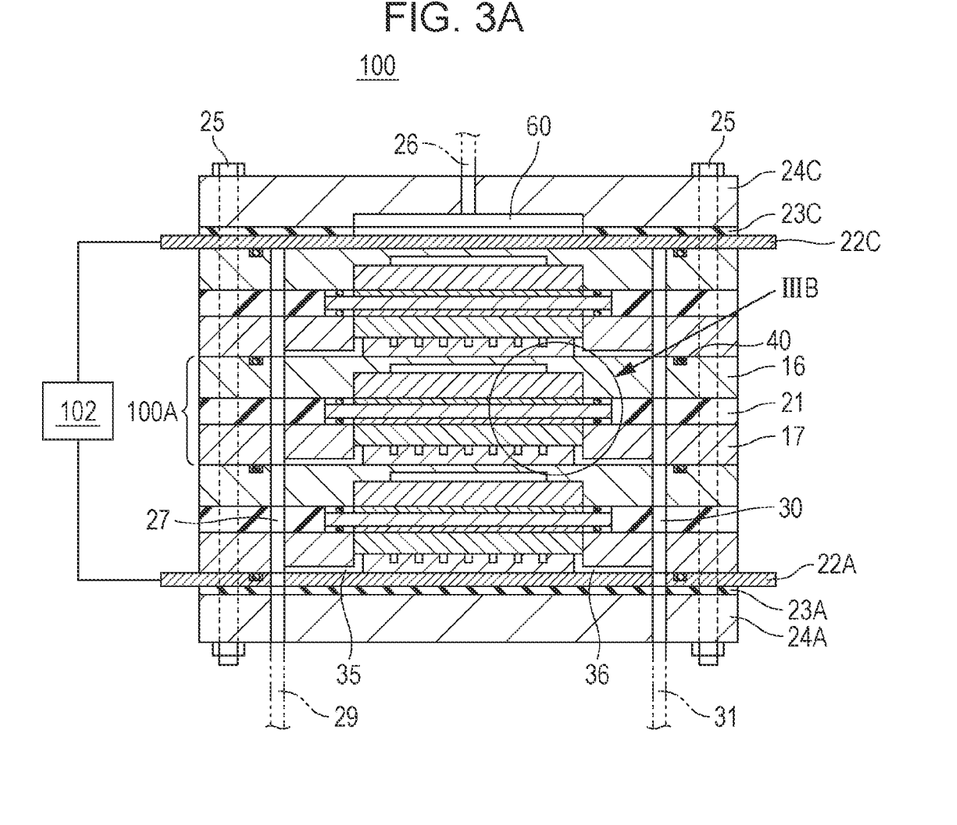
FIG. 3A is an image of an exemplary electrochemical hydrogen pump according to the first embodiment.
Figure 3B:
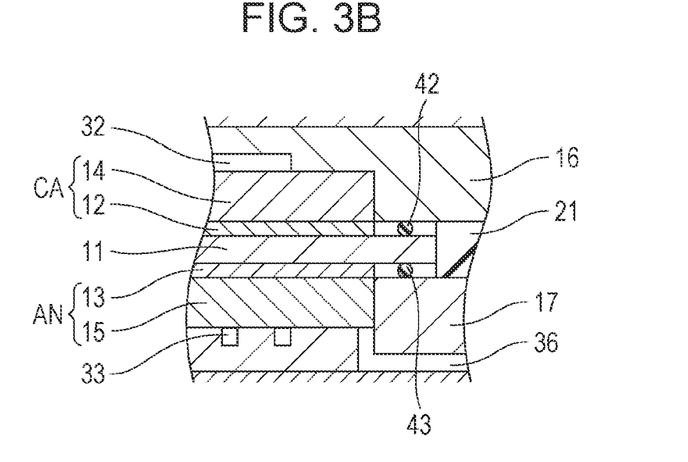
FIG. 3B is an enlarged view of portion IIIB of FIG. 3A.

FIG. 2A and FIG. 3A are each an image of an exemplary electrochemical hydrogen pump according to a first embodiment. FIG. 2B is an enlarged view of portion IIB of FIG. 2A. FIG. 3B is an enlarged view of portion IIIB of FIG. 3A.

FIG. 2A illustrates a vertical cross-section of an electrochemical hydrogen pump 100. The vertical cross-section includes a straight line passing through the center of the electrochemical hydrogen pump 100 and the center of a cathode gas discharge manifold 50 in plan view. FIG. 3A illustrates a vertical cross-section of the electrochemical hydrogen pump 100. The vertical cross-section includes a straight line passing through the center of the electrochemical hydrogen pump 100, the center of an anode gas intake manifold 27, and the center of an anode gas discharge manifold 30 in plan view.

In the examples illustrated in FIG. 2A and FIG. 3B, the electrochemical hydrogen pump 100 includes at least one hydrogen pump unit 100A.

In the electrochemical hydrogen pumps 100 illustrated in FIG. 2A and FIG. 3B, three hydrogen pump units 100A are stacked on each other; however, the number of the hydrogen pump units 100A is not limited thereto. In other words, the number of the hydrogen pump units 100A can be appropriately determined in accordance with operating conditions, such as the amount of hydrogen pressurized by the electrochemical hydrogen pump 100.

The hydrogen pump unit 100A includes an electrolyte membrane 11, an anode AN, a cathode CA, a cathode separator 16, an anode separator 17, and an insulator 21.

The anode AN is disposed on one main surface of the electrolyte membrane 11. The anode AN is an electrode including an anode catalyst layer 13 and an anode gas diffusion layer 15 disposed on the anode catalyst layer 13. An annular sealing member 43 is disposed so as to surround the periphery of the anode catalyst layer 13 in plan view to appropriately seal the anode catalyst layer 13.

The cathode CA is disposed on the other main surface of the electrolyte membrane 11. The cathode CA is an electrode including a cathode catalyst layer 12 and a cathode gas diffusion layer 14 disposed on the cathode catalyst layer 12. An annular sealing member 42 is disposed so as to surround the periphery of the cathode catalyst layer 12 in plan view to appropriately seal the cathode catalyst layer 12.

Accordingly, the electrolyte membrane 11 is sandwiched between the anode AN and the cathode CA so as to be in contact with the anode catalyst layer 13 and the cathode catalyst layer 12. A stack of the cathode CA, the electrolyte membrane 11, and the anode AN is referred to as a membrane electrode assembly (hereinafter, MEA).

The electrolyte membrane 11 has proton conductivity. The electrolyte membrane 11 may have any structure provided that the electrolyte membrane 11 has proton conductivity. Examples of the electrolyte membrane 11 include, but are not limited to, fluorine-based polymer electrolyte membranes and hydrocarbon-based polymer electrolyte membranes. Specifically, Nafion (trade name, manufactured by Du Pont) or Aciplex (trade name, manufactured by Asahi Kasei Corp.) may be used as the electrolyte membrane 11.

The anode catalyst layer 13 is disposed on one main surface of the electrolyte membrane 11. The catalytic metal contained in the anode catalyst layer 13 may be, but is not limited to, platinum.

The cathode catalyst layer 12 is disposed on the other main surface of the electrolyte membrane 11. The catalytic metal contained in the cathode catalyst layer 12 may be, but is not limited to, platinum.

Examples of a catalyst carrier of the cathode catalyst layer 12 and the anode catalyst layer 13 include, but are not limited to, carbon powders, such as carbon black and graphite, and conductive oxide powders.

In the cathode catalyst layer 12 and the anode catalyst layer 13, highly dispersed catalytic metal particulates are supported on the catalyst carrier. An ionomer component having hydrogen ion conductivity is typically added to the cathode catalyst layer 12 and the anode catalyst layer 13 to increase the electrode reaction area.

The anode gas diffusion layer 15 is formed of a porous material. The anode gas diffusion layer 15 is conductive and has gas diffusion properties. The anode gas diffusion layer 15 desirably has high stiffness and can suppress displacement and deformation of components due to a difference in pressure between the cathode CA and the anode AN during operation of the electrochemical hydrogen pump 100. In other words, the elastic modulus of the anode gas diffusion layer 15 is higher than the elastic modulus of the cathode gas diffusion layer 14.

Examples of the base material of the anode gas diffusion layer 15 include sintered bodies of a metal fiber made of a material, such as titanium, a titanium alloy, or stainless steel, sintered bodies of a metal powder made of such a material, expanded metals, metal meshes, and punching metals.

The cathode gas diffusion layer 14 is formed of a porous material. The cathode gas diffusion layer 14 is conductive and has gas diffusion properties. The cathode gas diffusion layer 14 desirably has an elastic modulus so as to appropriately follow displacement and deformation of components due to a difference in pressure between the cathode and the anode during operation of the electrochemical hydrogen pump 100. In other words, the elastic modulus of the cathode gas diffusion layer 14 is lower than the elastic modulus of the anode gas diffusion layer 15.

Examples of the base material of the cathode gas diffusion layer 14 include sintered bodies of a metal fiber made of a material, such as titanium, a titanium alloy, or stainless steel, and sintered bodies of a metal powder made of such a material. The base material of the cathode gas diffusion layer 14 may be a porous carbon material, such as carbon paper, carbon cloth, or carbon felt. Furthermore, a porous sheet material obtained by kneading and rolling an elastomer, such as carbon black or polytetrafluoroethylene (PTFE), may be used.

The anode separator 17 is a member stacked on the anode AN. The cathode separator 16 is a member stacked on the cathode CA. The cathode separator 16 and the anode separator 17 each have a concave portion in the center portion thereof. The cathode gas diffusion layer 14 is accommodated in the concave portion of the cathode separator 16. The anode gas diffusion layer 15 is accommodated in the concave portion of the anode separator 17.

The hydrogen pump unit 100A is formed by sandwiching the MEA between the cathode separator 16 and the anode separator 17, as described above.

In plan view, for example, a serpentine cathode gas flow channel 32 including a plurality of U-shaped curve portions and a plurality of straight portions is disposed in a main surface of the cathode separator 16 that is in contact with the cathode gas diffusion layer 14. The straight portions of the cathode gas flow channel 32 extend in a direction perpendicular to the sheet surface of FIG. 2A (direction parallel to the sheet surface of FIG. 3A). The cathode gas flow channel 32 is an example, and the cathode gas flow channel is not limited thereto. For example, the cathode gas flow channel may be formed of a plurality of straight channels.

In plan view, for example, a serpentine anode gas flow channel 33 including a plurality of U-shaped curve portions and a plurality of straight portions is disposed in a main surface of the anode separator 17 that is in contact with the anode gas diffusion layer 15. The straight portions of the anode gas flow channel 33 extend in a direction perpendicular to the sheet surface of FIG. 3A (a direction parallel to the sheet surface of FIG. 2A). The anode gas flow channel 33 is an example, and the anode gas flow channel is not limited thereto. For example, the anode gas flow channel may be formed of a plurality of straight channels.

The annular plate-like insulator 21, which is disposed so as to surround the periphery of the MEA, is sandwiched between the conductive cathode separator 16 and the conductive anode separator 17. Thus, a short circuit between the cathode separator 16 and the anode separator 17 is prevented.

As shown in FIG. 2A and FIG. 3A, the electrochemical hydrogen pump 100 includes a first fixing member for preventing movement of the cathode separator 16 in a direction in which the cathode separator 16 is stacked, a second fixing member for preventing movement of the anode separator 17 in a direction in which the anode separator 17 is stacked, an anode end plate 24A, and a cathode end plate 24C.

The anode end plate 24A is a member disposed on the anode separator 17 positioned at one end in a direction in which the cathode separator 16 is stacked. The expression "on the anode separator 17" means on a main surface of a pair of the main surfaces of the anode separator 17 that faces away from the anode AN. The cathode end plate 24C is a member disposed on the cathode separator 16 positioned at the other end in a direction in which the cathode separator 16 is stacked. The expression "on the cathode separator 16" means on a main surface of a pair of the main surfaces of the cathode separator 16 that faces away from the cathode CA.

The first fixing member may have any structure provided that the first fixing member fixes the cathode separator 16 in a direction in which the cathode separator 16 is stacked. For example, as shown in FIG. 2A and FIG. 3A, the first fixing member may be a fastener 25 used for applying fastening pressure to the hydrogen pump unit 100A. Examples of the fastener 25 include bolts and nuts with a disc spring.

The second fixing member may have any structure provided that the second fixing member fixes the anode separator 17 in a direction in which the anode separator 17 is stacked. For example, as shown in FIG. 2A and FIG. 3A, the second fixing member may be the fastener 25.

The bolt of the fastener 25 may be configured to pass through only the anode end plate 24A and the cathode end plate 24C; however, in the electrochemical hydrogen pump 100 according to the present embodiment, the bolt passes through each member of the three stacked hydrogen pump units 100A, a cathode power feeder plate 22C, a cathode insulating plate 23C, an anode power feeder plate 22A, an anode insulating plate 23A, the anode end plate 24A, and the cathode end plate 24C. The fastener 25 applies a desired fastening pressure to the hydrogen pump units 100A sandwiched between the cathode end plate 24C and the anode end plate 24A in a state in which the cathode end plate 24C presses the end surface of the cathode separator 16 positioned at the other end in the stacking direction, with the cathode power feeder plate 22C and the cathode insulating plate 23C disposed between the cathode end plate 24C and the cathode separator 16, and in which the anode end plate 24A presses the end surface of the anode separator 17 positioned at one end in the stacking direction, with the anode power feeder plate 22A and the anode insulating plate 23A disposed between the anode end plate 24A and the anode separator 17.

Accordingly, the fastening pressure of the fastener 25 appropriately holds the multi-stacked (three in this instance) hydrogen pump units 100A in a stacked state in the stacking direction, and the bolt of the fastener 25 passes through each member of the electrochemical hydrogen pump 100. Thus, movement of such a member in an in-plane direction is appropriately suppressed.

Here, a sealing material made of resin (not shown and not described in detail) may be disposed on the side surface of each member of the electrochemical hydrogen pump, instead of using the fastener 25, to fix the electrochemical hydrogen pump.

As shown in FIG. 2A and FIG. 3A, the electrochemical hydrogen pump 100 includes a first gas flow channel through which hydrogen in the cathode CA is supplied to a first space 60 formed between the cathode end plate 24C and the cathode separator 16.

The first space 60 may be any space formed between the cathode end plate 24C and the cathode separator 16. The first gas flow channel may have any structure provided that the hydrogen in the cathode CA is supplied to the first space 60 through the first gas flow channel.

For example, in the electrochemical hydrogen pump 100 according to the present embodiment, as shown in FIG. 2A, the first gas flow channel includes the cylindrical cathode gas discharge manifold 50 and a cathode gas supplying channel 51 connecting the cathode gas discharge manifold 50 and the first space 60 to each other.

Here, the first space 60 includes a concave portion disposed in the center portion of the cathode end plate 24C and an opening formed in the center portion of the cathode insulating plate 23C.

The cathode gas discharge manifold 50 includes a through-hole formed in each member of the three stacked hydrogen pump units 100A and a non-through hole formed in the anode end plate 24A and the cathode end plate 24C, and the through-holes and the non-through holes are connected to each other.

The cathode gas supplying channel 51 includes a groove formed in the main surface of the cathode end plate 24C that connects the concave portion (the first space 60) of the cathode end plate 24C and the other end of the cathode gas discharge manifold 50 to each other.

As shown in FIG. 2A, a cathode gas discharge channel 26 is disposed so as to pass through the cathode end plate 24C. The cathode gas discharge channel 26 may include a pipe through which hydrogen (H$_2$) discharged from the cathode CA flows. The cathode gas discharge channel 26 communicates with the first space 60. Accordingly, the cathode gas discharge channel 26 communicates with the cathode gas discharge manifold 50 through the first space 60 and the cathode gas supplying channel 51.

The cathode gas discharge manifold 50 communicates with one end of the cathode gas flow channel 32 through a cathode gas passing channel 34 in the hydrogen pump unit 100A. Accordingly, hydrogen that has passed through the cathode gas flow channel 32 and the cathode gas passing channel 34 of each hydrogen pump unit 100A is collected in the cathode gas discharge manifold 50. Then, the collected hydrogen passes through the cathode gas supplying channel 51 and the first space 60 in this order and flows to the cathode gas discharge channel 26. In such a manner, high-pressure hydrogen flows through the first space 60.

In plan view, an annular sealing member 40, such as an O-ring, is disposed between the cathode separator 16 and the anode separator 17, the cathode separator 16 and the cathode power feeder plate 22C, and the anode separator 17 and the anode power feeder plate 22A, so as to surround the cathode gas discharge manifold 50 to appropriately seal the cathode gas discharge manifold 50.

As shown in FIG. 3A, an anode gas intake channel 29 is disposed on the anode end plate 24A. The anode gas intake channel 29 may include a pipe through which hydrogen (H$_2$) to be supplied to the anode AN flows. The anode gas intake channel 29 communicates with the cylindrical anode gas intake manifold 27. The anode gas intake manifold 27 includes a through-hole formed in each member of the three stacked hydrogen pump units 100A and the anode end plate 24A, and the through-holes are connected to each other.

The anode gas intake manifold 27 communicates with one end of the anode gas flow channel 33 through a first anode gas passing channel 35 in the hydrogen pump unit 100A. Accordingly, hydrogen supplied from the anode gas intake channel 29 to the anode gas intake manifold 27 is distributed to the hydrogen pump units 100A through the respective first anode gas passing channels 35. While the distributed hydrogen passes through the anode gas flow channels 33, hydrogen is supplied from the anode gas diffusion layer 15 to the anode catalyst layer 13.

As shown in FIG. 3A, an anode gas discharge channel 31 is disposed on the anode end plate 24A. The anode gas discharge channel 31 may include a pipe through which hydrogen (H$_2$) discharged from the anode AN flows. The anode gas discharge channel 31 communicates with the cylindrical anode gas discharge manifold 30. The anode gas discharge manifold 30 includes a through-hole formed in each member of the three stacked hydrogen pump units 100A and the anode end plate 24A, and the through-holes are connected to each other.

The anode gas discharge manifold 30 communicates with the other end of the anode gas flow channel 33 through a second anode gas passing channel 36 in the hydrogen pump unit 100A. Accordingly, hydrogen that has passed through the anode gas flow channel 33 of each hydrogen pump unit 100A is supplied to and collected in the anode gas discharge manifold 30 through the second anode gas passing channel 36. Then, the collected hydrogen flows to the anode gas discharge channel 31.

In plan view, the annular sealing member 40, such as an O-ring, is disposed between the cathode separator 16 and the anode separator 17, between the cathode separator 16 and the cathode power feeder plate 22C, and between the anode separator 17 and the anode power feeder plate 22A, so as to surround the anode gas intake manifold 27 and the anode gas discharge manifold 30 to appropriately seal the anode gas intake manifold 27 and the anode gas discharge manifold 30.

As shown in FIG. 2A and FIG. 3A, the electrochemical hydrogen pump 100 includes a voltage application unit 102.

The voltage application unit 102 is a device that applies a voltage between the anode AN and the cathode CA. Specifically, the voltage application unit 102 applies a high potential to the conductive anode AN and a low potential to the conductive cathode CA. The voltage application unit 102 may have any structure provided that the voltage application unit 102 applies a voltage between the anode AN and the cathode CA. For example, the voltage application unit 102 may be a device that adjusts the voltage to be applied between the anode AN and the cathode CA. In such a case, the voltage application unit 102 includes a DC/DC converter when connected to a direct-current power source, such as a battery, a solar cell, or a fuel cell, or an AC/DC converter when connected to an alternating-current power source, such as a commercial power source.

In examples shown in FIG. 2A and FIG. 3A, the low potential terminal of the voltage application unit 102 is connected to the cathode power feeder plate 22C, and the high potential terminal of the voltage application unit 102 is connected to the anode power feeder plate 22A. The cathode power feeder plate 22C is in an electrical contact with the cathode separator 16 positioned at the other end in the stacking direction. The anode power feeder plate 22A is in an electrical contact with the anode separator 17 positioned at one end in the stacking direction.

A hydrogen supply system (not shown) including the electrochemical hydrogen pump 100 can be established. In such a case, a device needed for hydrogen supply operation of the hydrogen supply system is appropriately disposed in the system.

For example, the hydrogen supply system may include a dew point adjusting unit (e.g., humidifier) that adjusts the dew point of a gas mixture containing hydrogen ($H_2$) having high humidity discharged from the anode AN through the anode gas discharge channel 31 and hydrogen ($H_2$) having low humidity supplied from an external hydrogen supplier through the anode gas intake channel 29. In such a case, the hydrogen supplied from an external hydrogen supplier may be generated by, for example, a water electrolysis device.

For example, the hydrogen supply system may include a temperature measuring unit that measures the temperature of the electrochemical hydrogen pump 100, a hydrogen storage unit that temporarily stores hydrogen discharged from the cathode CA of the electrochemical hydrogen pump 100, and a pressure measuring unit that measures hydrogen gas pressure in the hydrogen storage unit.

Note that the above structure of the electrochemical hydrogen pump 100 and various units and devices (not shown) in the hydrogen supply system are examples, and the present disclosure is not limited to the examples.

For example, a dead-end structure in which the anode gas discharge manifold 30 and the anode gas discharge channel 31 are not disposed and in which all hydrogen to be supplied to the anode AN through the anode gas intake manifold 27 is pressurized in the cathode CA may be used. As described above, hydrogen ($H_2$) flows, for example, through the anode gas flow channel 33 and the cathode gas flow channel 32; however, "hydrogen" is not necessarily 100% hydrogen. A gas containing hydrogen may flow.

Operation

Hereinafter, an exemplary hydrogen pressurizing operation of the electrochemical hydrogen pump 100 will be described with reference to the drawings.

The following operation may be performed such that the arithmetic circuit of a controlling unit (not shown) reads out a controlling program from the memory circuit of the controlling unit. The following operation does not need to be performed by a controlling unit. The following operation may be partially performed by an operator.

First, low-pressure hydrogen is supplied to the anode AN of the electrochemical hydrogen pump 100, and a voltage is applied by the voltage application unit 102 to the electrochemical hydrogen pump 100.

Then, in the anode catalyst layer 13 of the anode AN, a hydrogen molecule is separated by the oxidation reaction into hydrogen ions (protons) and electrons (Formula (1)). The protons transfer to the cathode catalyst layer 12 through the electrolyte membrane 11. The electrons transfer to the cathode catalyst layer 12 through the voltage application unit 102.

Then, in the cathode catalyst layer 12, a hydrogen molecule is regenerated by the reduction reaction (Formula (2)). It is known that when the protons transfer through the electrolyte membrane 11, a certain amount of water (i.e., electro-osmotic water) transfers with the protons from the anode AN to the cathode CA.

At this time, hydrogen generated in the cathode CA can be pressurized by increasing pressure loss in a hydrogen discharge channel (e.g., cathode gas discharge channel 26 in FIG. 2A) by using a flow-rate adjusting unit (not shown) (e.g., a back-pressure valve or a regulating valve disposed in a pipe). Then, high-pressure hydrogen generated in the cathode CA is supplied to the first space 60 formed between the cathode end plate 24C and the cathode separator 16 through the cathode gas discharge manifold 50 and the cathode gas supplying channel 51.

anode:

(1)

cathode:

(2)

In such away, in the electrochemical hydrogen pump 100, applying a voltage by using the voltage application unit 102 leads to pressurization of hydrogen to be supplied to the anode AN in the cathode CA. Accordingly, hydrogen pressurizing operation of the electrochemical hydrogen pump 100 is performed, and the hydrogen pressurized in the cathode CA is temporarily stored in, for example, a hydrogen storage unit (not shown). The hydrogen stored in the hydrogen storage unit is timely supplied to a hydrogen demanding object. Examples of the hydrogen demanding object include fuel cells that generate power by using hydrogen.

Here, in the above hydrogen pressurizing operation of the electrochemical hydrogen pump 100, gas pressure is increased in the cathode CA, and thus, the electrolyte membrane 11, the anode catalyst layer 13, and the anode gas diffusion layer 15 are pressed. Then, the pressing force compresses the electrolyte membrane 11, the anode catalyst layer 13, and the anode gas diffusion layer 15.

At this time, if adhesion between the cathode catalyst layer 12 and the cathode gas diffusion layer 14 is low, a gap is likely to be formed therebetween. If a gap is formed between the cathode catalyst layer 12 and the cathode gas diffusion layer 14, the contact resistance therebetween increases. Then, an increase in a voltage applied by the voltage application unit 102 may cause degradation of the operation efficiency of the electrochemical hydrogen pump 100.

Before the hydrogen pump unit 100A is fastened by the fastener 25, the cathode gas diffusion layer 14 is configured to protrude by a predetermined amount of protrusion from the concave portion of the cathode separator 16 in the thickness direction. When the hydrogen pump unit 100A is fastened, the cathode gas diffusion layer 14 is compressed by the amount of protrusion by the fastening force of the fastener 25.

If the electrolyte membrane 11, the anode catalyst layer 13, and the anode gas diffusion layer 15 are each compressed and deform during operation of the electrochemical hydrogen pump 100, the cathode gas diffusion layer 14 elastically deforms in a direction in which the thickness after the compression by the fastener 25 returns to the original thickness before the compression, so that the contact between the cathode catalyst layer 12 and the cathode gas diffusion layer 14 is appropriately maintained in the electrochemical hydrogen pump 100 according to the present embodiment.

The electrochemical hydrogen pump 100 according to the present embodiment can easily and appropriately suppress an increase in the contact resistance between the cathode separator 16 and the cathode CA of the hydrogen pump unit 100A, compared with that in the prior art.

Specifically, high-pressure hydrogen in the cathode CA of the hydrogen pump unit 100A can be supplied to the first space 60 formed between the cathode end plate 24C and the cathode separator 16 through the cathode gas discharge manifold 50 and the cathode gas supplying channel 51. Thus, hydrogen gas pressure in the first space 60 is almost as high as the hydrogen gas pressure in the cathode CA of the hydrogen pump unit 100A. The load applied by the hydrogen in the first space 60 to the cathode separator 16 suppresses deformation of the cathode separator 16 due to hydrogen gas pressure in the cathode CA. Thus, a gap is unlikely to be formed between the cathode separator 16 and the cathode CA of the hydrogen pump unit 100A, compared with a case in which the first space 60 is not formed, so that the electrochemical hydrogen pump 100 according to the present embodiment can easily and appropriately suppress an increase in the contact resistance between the cathode separator 16 and the cathode CA of the hydrogen pump unit 100A.

First Example

The electrochemical hydrogen pump 100 in the present example is the same as the electrochemical hydrogen pump 100 according to the first embodiment, except that the first space 60 is formed parallel to the main surface of the cathode CA.

According to such a structure, the load to be applied to the cathode separator 16 can be uniformly applied to the surface thereof on the basis of the hydrogen gas pressure in the first space 60. Thus, in the electrochemical hydrogen pump 100 in the present example, a load applied by the hydrogen in the first space 60 to the cathode separator 16 effectively suppresses deformation (deflection) of the cathode separator 16, compared with a case in which the first space 60 is not formed parallel to the main surface of the cathode CA.

The electrochemical hydrogen pump 100 in the present example may be the same as the electrochemical hydrogen pump 100 according to the first embodiment, except for the above feature.

Second Example

The electrochemical hydrogen pump 100 in the present example is the same as the electrochemical hydrogen pump 100 according to the first embodiment, except that the area of an opening of the first space 60 that is parallel to the main surface of the cathode separator 16 is equal to or larger than the area of the main surface of the cathode CA. Note that the area of such an opening of the first space 60 is equal to or smaller than the area of the main surface of the cathode separator 16.

If the area of an opening of the first space 60 that is parallel to the main surface of the cathode separator 16 is smaller than the area of the main surface of the cathode CA (i.e., area of the opening of the first space 60<area of the main surface of the cathode CA), deformation due to the hydrogen gas pressure in the cathode CA may occur in a portion of the cathode separator 16 that faces a portion of the cathode CA that is not overlapped by the first space 60.

In the electrochemical hydrogen pump 100 in the present example, the area of the opening of the first space 60 is set to be equal to or larger than the area of the main surface of the cathode CA (i.e., area of the opening of the first space 60≥area of the main surface of the cathode CA), so that the first space 60 can overlap all the area of the main surface of the cathode CA. Therefore, the load is applied on the basis of the hydrogen gas pressure in the first space 60 to all of a portion of the cathode separator 16 that faces the cathode CA, and thus, the above risk can be decreased.

The electrochemical hydrogen pump 100 in the present example may be the same as the electrochemical hydrogen pump 100 according to the first embodiment or the electrochemical hydrogen pump 100 in the first example of the first embodiment, except for the above feature.

Modified Example

Figure 4:
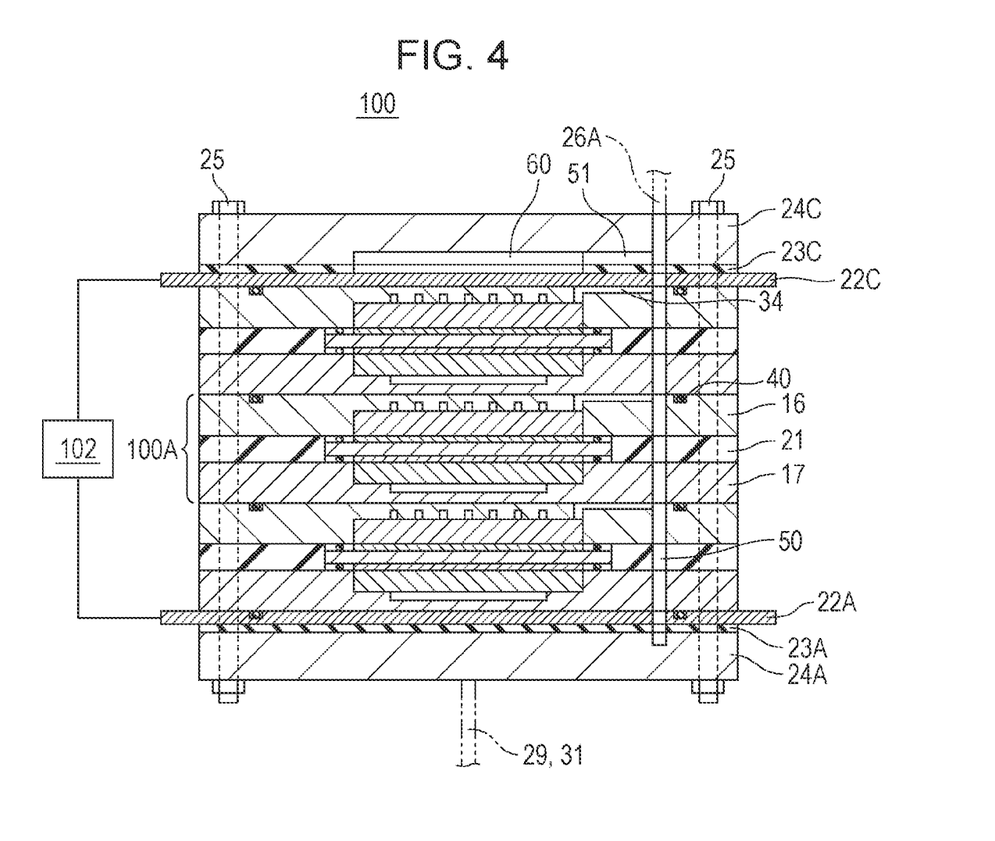
FIG. 4 is an image of an exemplary electrochemical hydrogen pump in a modified example of the first embodiment.

FIG. 4 is an exemplary electrochemical hydrogen pump in a modified example of the first embodiment.

FIG. 4 illustrates a vertical cross-section of the electrochemical hydrogen pump 100. The vertical cross-section includes a straight line passing through the center of the electrochemical hydrogen pump 100 and the center of the cathode gas discharge manifold 50 in plan view.

The electrochemical hydrogen pump 100 in the present modified example is the same as the electrochemical hydrogen pump 100 according to the first embodiment, except for the position of a cathode gas discharge channel 26A, which will be described below.

In the electrochemical hydrogen pump 100 in the present modified example, the cathode gas discharge channel 26A is disposed so as to extend from the cathode gas discharge manifold 50 and is different from the cathode gas discharge channel 26 in FIG. 2A, which is disposed so as to extend from the first space 60.

In this case, the cathode gas discharge manifold 50 includes a through-hole formed in each member of the three stacked hydrogen pump units 100A and the cathode end plate 24C and a non-through hole formed in the anode end plate 24A, and the through-holes and the non-through hole are connected to each other.

Accordingly, the electrochemical hydrogen pump 100 in the present modified example can supply high-pressure hydrogen in the cathode CA of the hydrogen pump unit 100A to the first space 60 formed between the cathode end plate 24C and the cathode separator 16 through the cathode gas discharge manifold 50 and the cathode gas supplying channel 51. In other words, high-pressure hydrogen is retained in the first space 60.

The electrochemical hydrogen pump 100 in the present modified example exhibits the same advantages as the electrochemical hydrogen pump 100 according to the first embodiment, and thus, the detailed description is omitted.

The electrochemical hydrogen pump 100 in the present modified example may be the same as the electrochemical hydrogen pump 100 according to the first embodiment, or the electrochemical hydrogen pump 100 in the first example or the second example of the first embodiment, except for the above feature.

Second Embodiment

Figure 5:
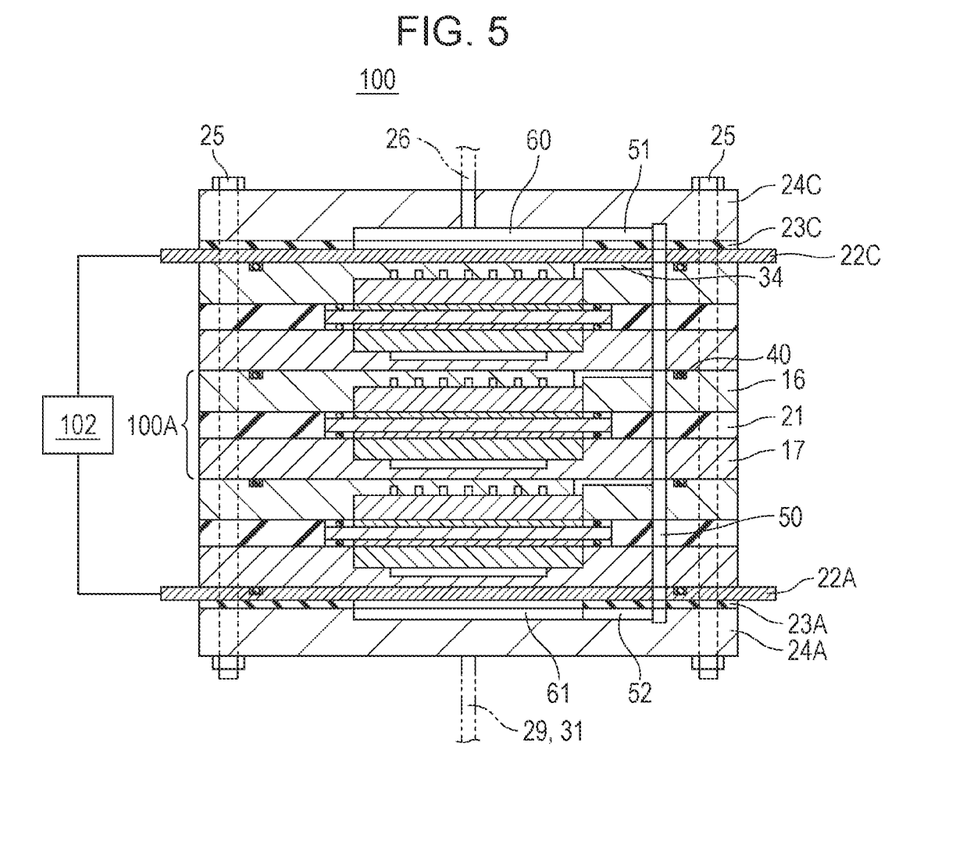
FIG. 5 is an image of an exemplary electrochemical hydrogen pump according to a second embodiment.

FIG. 5 illustrates an exemplary electrochemical hydrogen pump according to a second embodiment.

FIG. 5 illustrates a vertical cross-section of the electrochemical hydrogen pump 100. The vertical cross-section includes a straight line passing through the center of the electrochemical hydrogen pump 100 and the center of the cathode gas discharge manifold 50 in plan view.

The electrochemical hydrogen pump 100 according to the present embodiment is the same as the electrochemical hydrogen pump 100 according to the first embodiment, except that a second space 61 and a second gas flow channel, which will be described below, are included.

As shown in FIG. 5, the electrochemical hydrogen pump 100 includes a second gas flow channel through which hydrogen generated in the cathode CA (see FIG. 2B) is supplied to the second space 61 formed between the anode end plate 24A and the anode separator 17.

The second space 61 may be any space formed between the anode end plate 24A and the anode separator 17. The second gas flow channel may have any structure provided that the hydrogen in the cathode CA is supplied to the second space 61 through the second gas flow channel.

For example, in the electrochemical hydrogen pump 100 according to the present embodiment, as shown in FIG. 5, the second gas flow channel includes the cylindrical cathode gas discharge manifold 50 and a cathode gas supplying channel 52 connecting the cathode gas discharge manifold 50 and the second space 61 to each other. Another exemplary second gas flow channel will be described in a modified example.

Here, the second space 61 includes a concave portion disposed in the center portion of the anode end plate 24A and an opening formed in the center portion of the anode insulating plate 23A.

The cathode gas discharge manifold 50 includes a through-hole formed in each member of the three stacked hydrogen pump units 100A and a non-through hole formed in the anode end plate 24A and the cathode end plate 24C, and the through-holes and the non-through holes are connected to each other, in the same manner as in the first embodiment.

The cathode gas supplying channel 52 includes a groove formed in the main surface of the anode end plate 24A that connects the concave portion (the second space 61) of the anode end plate 24A and one end of the cathode gas discharge manifold 50 to each other.

As described above, the electrochemical hydrogen pump 100 according to the present embodiment can supply high-pressure hydrogen in the cathode CA of the hydrogen pump unit 100A to the second space 61 formed between the anode end plate 24A and the anode separator 17 through the cathode gas discharge manifold 50 and the cathode gas supplying channel 52. Thus, hydrogen gas pressure in the second space 61 is almost as high as the hydrogen gas pressure in the cathode CA of the hydrogen pump unit 100A. The load applied by the hydrogen in the second space 61 to the anode separator 17 suppresses deformation of the anode separator 17 due to hydrogen gas pressure in the cathode CA. Thus, a gap is unlikely to be formed between the cathode gas diffusion layer 14 of the cathode CA and the electrolyte membrane 11 (i.e., in the cathode catalyst layer 12) of the hydrogen pump unit 100A, compared with a case in which the second space 61 is not formed, and therefore, the electrochemical hydrogen pump 100 according to the present embodiment can easily and appropriately suppress an increase in the contact resistance therebetween.

When the electrolyte membrane 11 is, for example, a polymer electrolyte membrane, the polymer electrolyte membrane exhibits a desired proton conductivity in a wet state. Thus, to maintain a desired efficiency of the hydrogen pressurizing operation of the electrochemical hydrogen pump 100, the electrolyte membrane 11 needs to be maintained in a wet state. If the anode gas flow channel 33 (see FIG. 2B) of the anode separator 17, for example, is clogged with water, hydrogen supply in the hydrogen pump unit 100A is prevented. In other words, stabilizing the flow of hydrogen passing through the anode gas flow channel 33 is an important factor for a high-efficient hydrogen pressurizing operation of the electrochemical hydrogen pump 100. In the electrochemical hydrogen pump 100 according to the present embodiment, deformation of the anode separator 17 is suppressed regardless of the pressure of hydrogen gas in the cathode CA of the hydrogen pump unit 100A, compared with a case in which the second space 61 is not formed, and thus, the flow of hydrogen passing through the anode gas flow channel 33, which passes through the anode separator 17, can be appropriately stabilized.

The electrochemical hydrogen pump 100 according to the present embodiment may be the same as the electrochemical hydrogen pump 100 according to the first embodiment or the electrochemical hydrogen pump 100 in the first, second, or modified examples of the first embodiment, except for the above feature.

First Example

The electrochemical hydrogen pump 100 in the present example is the same as the electrochemical hydrogen pump 100 according to the second embodiment, except that the first space 60 and the second space 61 are formed to face each other.

According to such a structure, the load applied by the hydrogen in the first space 60 to the cathode separator 16 and the load applied by the hydrogen in the second space 61 to the anode separator 17 uniformly suppress deformation, which is due to hydrogen gas pressure in the cathode CA, in the surface of each member of the hydrogen pump unit 100A from both ends of the hydrogen pump unit 100A.

Thus, the electrochemical hydrogen pump 100 in the present example can effectively suppress deformation of each member of the hydrogen pump unit 100A, compared with a case in which the first space 60 and the second space 61 are not formed to face each other.

The electrochemical hydrogen pump 100 in the present example may be the same as the electrochemical hydrogen pump 100 according to the second embodiment, except for the above feature.

Second Example

The electrochemical hydrogen pump 100 in the present example is the same as the electrochemical hydrogen pump 100 according to the second embodiment, except that the second space 61 is formed parallel to the main surface of the anode AN (see FIG. 2B).

According to such a structure, the load to be applied to the anode separator 17 can be uniformly applied to the surface thereof on the basis of the hydrogen gas pressure in the second space 61. Thus, in the electrochemical hydrogen pump 100 in the present example, the load applied by the hydrogen in the second space 61 to the anode separator 17 effectively suppresses deformation (deflection) of the anode separator 17, compared with a case in which the second space 61 is not formed parallel to the main surface of the anode AN.

The electrochemical hydrogen pump 100 in the present example may be the same as the electrochemical hydrogen pump 100 according to the second embodiment or the electrochemical hydrogen pump 100 in the first example of the second embodiment, except for the above feature.

Third Example

The electrochemical hydrogen pump 100 in the present example is the same as the electrochemical hydrogen pump 100 according to the second embodiment, except that the area of an opening of the second space 61 that is parallel to the main surface of the anode separator 17 is equal to or larger than the area of the main surface of the anode AN (see FIG. 2B). Note that the area of such an opening of the second space 61 is equal to or smaller than the area of the main surface of the anode separator 17.

If the area of an opening of the second space 61 that is parallel to the main surface of the anode separator 17 is smaller than the area of the main surface of the anode AN (i.e., area of the opening of the second space 61<area of the main surface of the anode AN), deformation due to the hydrogen gas pressure in the cathode CA may occur in a portion of the anode separator 17 that faces a portion of the anode AN that is not overlapped by the second space 61.

In the electrochemical hydrogen pump 100 in the present example, the area of the opening of the second space 61 is set to be equal to or larger than the area of the main surface of the anode AN (i.e., area of the opening of the second space 61≥area of the main surface of the anode AN), so that the second space 61 can overlap all the area of the main surface of the anode AN. Therefore, the load is applied on the basis of the hydrogen gas pressure in the second space 61 to all of a portion of the anode separator 17 that faces the anode AN, and thus, the above risk can be decreased.

The electrochemical hydrogen pump 100 in the present example may be the same as the electrochemical hydrogen pump 100 according to the second embodiment or the electrochemical hydrogen pump 100 in the first example or the second example of the second embodiment, except for the above feature.

Modified Example

Figure 6:
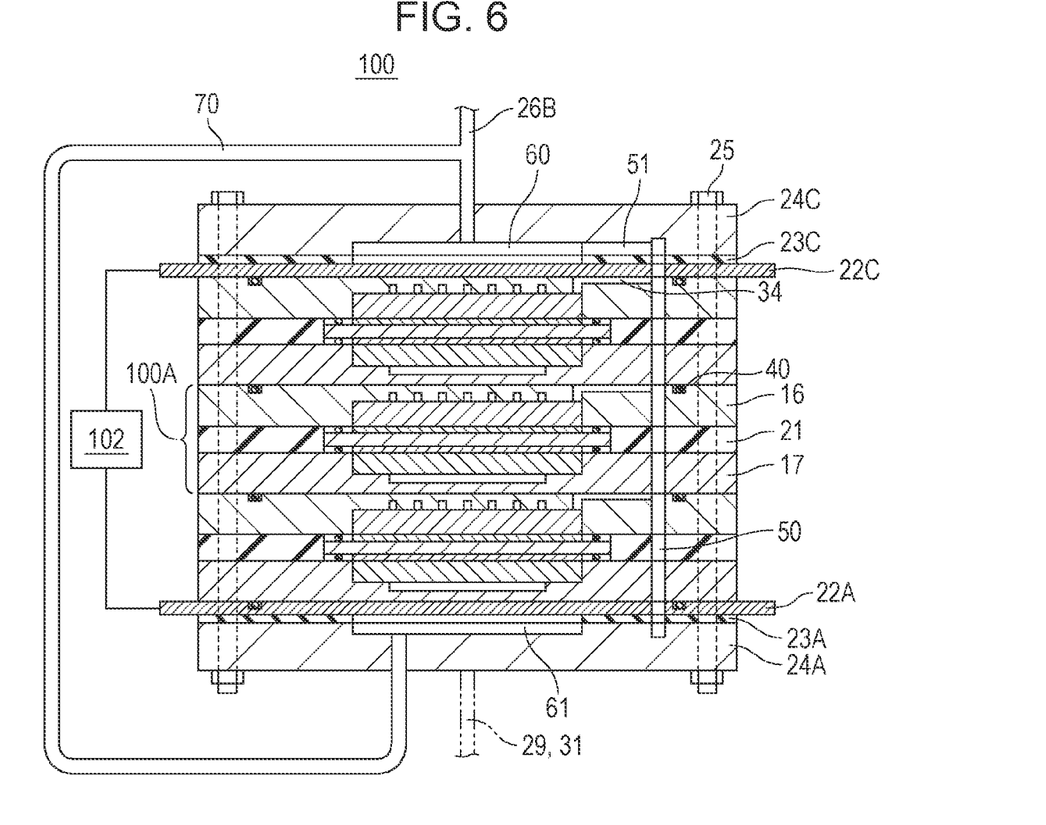
FIG. 6 is an image of an exemplary electrochemical hydrogen pump in a modified example of the second embodiment.

FIG. 6 is an exemplary electrochemical hydrogen pump in a modified example of the second embodiment.

FIG. 6 illustrates a vertical cross-section of the electrochemical hydrogen pump 100. The vertical cross-section includes a straight line passing through the center of the electrochemical hydrogen pump 100 and the center of the cathode gas discharge manifold 50 in plan view.

The electrochemical hydrogen pump 100 according to the present modified example is the same as the electrochemical hydrogen pump 100 according to the second embodiment, except for the structure of a second gas flow channel, which will be described below.

In the electrochemical hydrogen pump 100 according to the present modified example, the second gas flow channel includes a communicating channel that connects the first space 60 and the second space 61 to each other. In this case, the cathode gas supplying channel 52 (see FIG. 5) that connects the cathode gas discharge manifold 50 and the second space 61 to each other does not need to be formed.

Specifically, for example, as shown in FIG. 6, a communicating channel member 70 branching from a cathode gas discharge pipe 26B included in the cathode gas discharge channel 26 passes through the anode end plate 24A and extends to the second space 61. In other words, in the example shown in FIG. 6, the communicating channel member 70 is a member connecting the first space 60 and the second space 61 to each other; however, the structure of the communicating channel member is not limited thereto. For example, the communicating channel member may pass through the cathode end plate 24C and the anode end plate 24A without branching from the cathode gas discharge pipe 26B.

Accordingly, the electrochemical hydrogen pump 100 in the present modified example supplies high-pressure hydrogen in the cathode CA of the hydrogen pump unit 100A to the second space 61 formed between the anode end plate 24A and the anode separator 17 through the communicating channel member 70.

The electrochemical hydrogen pump 100 in the present modified example exhibits the same advantages as the electrochemical hydrogen pump 100 according to the second embodiment, and thus, the detailed description is omitted.

The electrochemical hydrogen pump 100 in the present modified example may be the same as the electrochemical hydrogen pump 100 according to the second embodiment or the electrochemical hydrogen pump 100 in any one of the first to third examples of the second embodiment, except for the above feature.

The first embodiment, the first and second examples of the first embodiment, the modified example of the first embodiment, the second embodiment, the first to third examples of the second embodiment, and the modified example of the second embodiment may be combined with each other provided that they are compatible with each other.

From the above description, those skilled in the art will appreciate numerous modifications and other embodiments of the present disclosure. Accordingly, the above description is understood to be illustrative only and is provided to teach those skilled in the art the best mode to perform the present disclosure. The structure and/or function may be substantially changed within the spirit of the present disclosure.

An aspect of the present disclosure can be applied to an electrochemical hydrogen pump that can easily and appropriately suppress an increase, compared with that in the prior art, in the contact resistance between a cathode separator and a cathode of the hydrogen pump unit.

What is claimed is:
1. An electrochemical hydrogen pump comprising:
at least one hydrogen pump unit including an electrolyte membrane, an anode in contact with one main surface of the electrolyte membrane, a cathode in contact with another main surface of the electrolyte membrane, an anode separator stacked on the anode, and a cathode separator stacked on the cathode, the at least one hydrogen pump unit transferring, to the cathode, hydrogen contained in a hydrogen-containing gas supplied to the anode and pressurizing the hydrogen;
an anode end plate disposed on the anode separator positioned at one end in the stacking direction;
a cathode end plate disposed on the cathode separator positioned at another end in the stacking direction;
a first fixing member for preventing movement of a member which is located at least from the anode end plate to the anode separator located at one end in the stacking direction; and
a first gas flow channel through which hydrogen in the cathode is supplied to a first space formed between the anode end plate and the anode separator.

2. The electrochemical hydrogen pump according to claim 1, wherein the first space is formed parallel to a main surface of the anode.

3. The electrochemical hydrogen pump according to claim 1, wherein an area of an opening of the first space that is parallel to a main surface of the anode separator is equal to or larger than an area of a main surface of the anode.

4. The electrochemical hydrogen pump according to claim 1, wherein an area of an opening of the first space that is parallel to a main surface of the anode separator is equal to or smaller than an area of the main surface of the anode separator.

5. The electrochemical hydrogen pump according to claim 1,
wherein the anode includes an anode gas diffusion layer,
the cathode includes a cathode gas diffusion layer, and
an elastic modulus of the anode gas diffusion layer is higher than an elastic modulus of the cathode gas diffusion layer.

* * * * *